(12) United States Patent
Sigman et al.

(10) Patent No.: US 8,664,319 B2
(45) Date of Patent: Mar. 4, 2014

(54) METHODS FOR STABILIZING HYDROUS KAOLIN

(75) Inventors: Michael Barron Sigman, Haddock, GA (US); Sharad Mathur, Tega Cay, SC (US); Kenneth W. Folmar, Macon, GA (US); Timothy M. Young, Dublin, GA (US)

(73) Assignee: BASF Corporation, Florham Park, NJ (US)

( * ) Notice: Subject to any disclaimer, the term of this patent is extended or adjusted under 35 U.S.C. 154(b) by 239 days.

(21) Appl. No.: 12/641,358

(22) Filed: Dec. 18, 2009

(65) Prior Publication Data

US 2010/0160526 A1 Jun. 24, 2010

Related U.S. Application Data

(60) Provisional application No. 61/138,632, filed on Dec. 18, 2008.

(51) Int. Cl.
*C08K 3/34* (2006.01)
*C08K 3/36* (2006.01)
*C09C 1/42* (2006.01)

(52) U.S. Cl.
USPC ........... 524/447; 524/425; 524/791; 524/445; 106/487

(58) Field of Classification Search
USPC ................... 524/447, 425, 791, 445; 106/487
See application file for complete search history.

(56) References Cited

U.S. PATENT DOCUMENTS

| | | | | |
|---|---|---|---|---|
| 4,650,521 A | * | 3/1987 | Koppelman et al. | 524/447 |
| 4,742,105 A | * | 5/1988 | Kelley | 524/447 |
| 5,223,463 A | * | 6/1993 | Bilimoria et al. | 501/146 |
| 5,522,986 A | | 6/1996 | Shi et al. | |
| 5,543,372 A | * | 8/1996 | Shi et al. | 501/145 |
| 5,603,411 A | | 2/1997 | Williams et al. | |
| 6,007,618 A | | 12/1999 | Norris et al. | |
| 6,136,086 A | | 10/2000 | Hen et al. | |
| 6,346,145 B1 | * | 2/2002 | Hen et al. | 106/486 |
| 6,390,301 B1 | * | 5/2002 | Nagaraj et al. | 209/5 |
| 2005/0081753 A1 | * | 4/2005 | Nichols | 106/486 |

OTHER PUBLICATIONS

Srdjan M. Bulatovic, Handbook of Flotation Reagents, Elsevier, vol. 1, p. 65.*
Zaman, A.A. et al.; Applied Clay Science; 'Effects of process variables and their interactions on solubility of metal ions from crude kaolin particles: results of a statistical design of experiments'; vol. 22; Issue 5; Dated Apr. 2003; pp. 237-250; see pp. 238 and Table 2.
PCT International Search Report; Dated Aug. 6, 2010.

* cited by examiner

*Primary Examiner* — James J Seidleck
*Assistant Examiner* — Deve E Valdez
(74) *Attorney, Agent, or Firm* — Laura C. DiLorenzo

(57) ABSTRACT

This invention is directed to a method of stabilizing high solid slurries, like kaolin slurries, the method comprises causticizing the sodium polycrylate or polyacrylic acid used in a dispersant blend to a pH of above 9. The method comprises a homogeneous dispersant blend of sodium carbonate, sodium polyacrylate, sodium silicate, and sodium hydroxide. This invention is also directed to a method of stabilizing high solid slurries, like kaolin slurries, by adding sodium polyacrylate at an acidic pH range or polyacrylic acid solution to the slurries: and adding a blend of soda ash and sodium silicate to the slurries.

10 Claims, No Drawings

METHODS FOR STABILIZING HYDROUS KAOLIN

FIELD OF THE INVENTION

The present invention relates to stabilizing hydrous kaolin. In particular, this invention is directed to using alkaline polyacrylates as a component in dispersant blends that are suitable for dispersing and improving the stability of hydrous kaolin.

BACKGROUND OF THE INVENTION

Currently, sodium hexametaphosphate (SHMP) and sodium polyacrylate are typically used to form stable high solids kaolin slurries. In particular, the high charge to weight ratio imparted by SHMP is particularly effective in prolonging the stability of clay slurries. However, the primary concern with the use of SHMP or other phosphates that are typically used in dispersant applications such as tetrasodium pyrophosphate and sodium tripolyphosphate is a substantial increase in cost over recent periods. The cost increase associated with these materials has made it increasingly prohibitive for the present purpose. In particular, the implementation in 2007 of anti-dumping duties by the U.S. Trade Commission on SHMP imported from China has limited the supply of SHMP in the U.S., leading to a dramatic decrease in the supply of SHMP in the U.S. and an increase in the cost associated with it.

It is desirable in the industry to provide for a more economical process for stabilizing dispersant blends without the use of SHMP.

SUMMARY OF THE INVENTION

This invention is directed to a method of stabilizing high solid slurries, like kaolin slurries, the method comprises causticizing sodium polyacrylate or polyacrylic acid used in a dispersant blend to a pH of above 9. The dispersant comprises a homogeneous blend of sodium carbonate, sodium polyacrylate, sodium silicate, and sodium hydroxide.

This invention is directed to a method of stabilizing high solid slurries, like kaolin slurries, by adding sodium polyacrylate at an acidic pH range or polyacrylic acid solution to the slurries; and adding a blend of solid soda ash and sodium silicate to the slurries.

DETAILED DESCRIPTION OF THE INVENTION

In an embodiment, this invention consists of novel dispersant compositions without the use of phosphates that result in the production of high solids slurries with long term stability. These compositions are formed by adjusting the pH of a polyacrylate to >9 in order to produce a homogeneous dispersant blend that is suitable for maintaining stable, high solids slurries that are neutral in pH. In an embodiment, the pH of the polyacrylate is adjusted to greater than 8. The dispersant blend consists of four components including sodium carbonate (soda ash), sodium polyacrylate or polyacrylic acid, sodium silicate, and sodium hydroxide (NaOH). By causticizing the polyacrylate, homogeneous dispersant blends can be formed with the components that would result in gelling or precipitation if polyacrylates of lower pH were used. The four component blend identified above has been found to provide slurry stabilization comparable to dispersant blends containing phosphates such as sodium hexametaphosphate (SHMP) as determined by changes in Brookfield viscosity measurements over time. The four component blend significantly increases the long term stability of kaolin slurries relative to the use of two or three component blends consisting of soda ash, sodium polyacrylate, and/or sodium silicate alone.

Another embodiment of this invention is to use two separate additions to the kaolin slurry consisting of a low pH (<7) sodium polyacrylate or polyacrylic acid solution and a blend of soda ash and sodium silicate. This eliminates the gelling problems associated with blending the low pH sodium polyacrylate together with soda ash and sodium silicate while maintaining the advantages of enabling the formation of stable, high solids kaolin slurries.

The rheological properties of clay slurries are a critical factor in the processing of end applications both from a performance and an economic aspect. Dispersants are used to increase the solids loadings of aqueous clay slurries that may be achieved while maintaining the corresponding viscosity at a level that enables effective transport and processability. Dispersants are also critical to maintaining slurry stability increasing the time that material may be stored or transported prior to final processing. Dispersants function by imparting either electrostatic and/or steric forces on the surface of the particles suspended in an aqueous media. SHMP and sodium polyacrylate are typically used to form stable high solids kaolin slurries. In particular, the high charge to weight ratio imparted by SHMP is particularly effective in prolonging the stability of clay slurries.

This invention utilizes a causticized polyacrylate as a component in a blend consisting of soda ash, sodium polyacrylate, sodium silicate, and sodium hydroxide to produce high solids (>65% clay by weight) slurries that are stable on the order of 45 days or longer as approximated through heat age testing without the need to use SHMP. The primary concern with the use of SHMP or other phosphates that are typically used in dispersant applications such as tetrasodium pyrophosphate and sodium tripolyphosphate is cost.

The invention consists of novel dispersant compositions without the use of phosphates that result in the production of high solids slurries with long term stability. This may be accomplished in two ways.

The first is through the use of a polyacrylate that has been causticized to a pH>9 as a component in a dispersant blend consisting of 5 to 50% soda ash, 15 to 45% sodium polyacrylate, 15 to 55% sodium silicate, and 0 to 25% NaOH by weight that disperse kaolin slurries comparably at neutral pH values (6 to 8 pH units) to dispersant blends containing SHMP.

In an embodiment, the average molecular weight of the sodium polyacrylate or the polyacrylic acid as measured by size exclusion chromatography can range from 1900 to 6000. In another embodiment, the average molecular weight of the sodium polyacrylate or the polyacrylic acid as measure by size exclusion chromatography can range from 2600 to 4400.

In an embodiment, the modulus or weight ratio of $SiO_2$ to $Na_2O$ of the sodium silicate can range from 1.6 to 3.3. In another embodiment, the modulus of sodium silicate can range from 1.8 to 2.6.

The process of the invention provides stable dispersion while maintaining the kaolin slurry at a neutral pH suitable for use in applications such as paper coatings, architectural coatings, etc. Three component dispersant blends consisting of soda ash, a low pH sodium polyacrylate (pH<6.0), and sodium silicate in ratios of interest for dispersant applications resulted in the formation of a gel that was unsuitable for use in processing. By adding NaOH to the sodium polyacrylate to raise the pH to >9.0 prior to the soda ash and sodium silicate, a dispersant blend may be formed that can be charged as a single addition to the kaolin slurry. Adjusting the ratio of soda ash and sodium silicate could then be modified to produce stable kaolin slurries in the pH range of 6.0 to 8.0. The performance of the dispersant blends were comparable with respect to rheology and age stability to dispersant blends containing SHMP at significantly lower processing costs.

The second route to obtaining the novel dispersant compositions described in this invention is to add a low pH (<7) sodium polyacrylate to a kaolin slurry separately from the addition of soda ash and sodium silicate. By adding the low pH sodium polyacrylate individually relative to the other dispersant components during kaolin slurry make down, combinations of low pH sodium polyacrylate, soda ash, and sodium silicate were able to be used resulting in slurries that meet the criteria of neutral pH and prolonged stability without gelling.

Example 1

Example 1 shows data obtained for 3 samples (A, B, C) of dispersant. The sodium polyacrylate used in these blends were produced by manufacturer A. A control sample consisting of a dispersant blend containing SHMP is provided for comparison of dispersant performance. The dispersant blends

|  | Control* | A | B | C |
|---|---|---|---|---|
| Dispersant Blend Composition | | | | |
| % Soda Ash | 45.5 | 20.6 | 21.4 | 35.8 |
| % Sodium Polyacrylate/ Polyacrylic Acid | 24.5 | 22.9 | 30.0 | 28.3 |
| % Sodium Silicate | N/A | 50.0 | 32.6 | 30.6 |
| % NaOH | N/A | 6.5 | 16.0 | 5.3 |
| % SHMP | 30 | N/A | N/A | N/A |
| Optimum Dispersant Dosage (#/ton) | 8.25 | 10.5 | 9.0 | 10.25 |
| Slurry pH | 6.5 | 7.2 | 6.4 | 7.4 |
| Brookfield Viscosity (cP) | | | | |
| Initial | 270 | 295 | 286 | 325 |
| 24 hr | 346 | 358 | 360 | 435 |
| 48 hr | 420 | 390 | 385 | 620 |
| 7 day | 832 | 490 | 800 | 712 |

*Composition of the dispersant blend described in the control is proprietary to BASF.

Example 2

Example 2 contains dispersant blend samples D through J. The sodium polyacrylate used in these blends were produced by manufacturer B. The control samples correspond to the experimental samples located in the column/columns to the left of the specific control. These results demonstrated that the proposed invention is not reliant on a specific sodium polyacrylate producer, but is applicable over a range of sodium polyacrylates suitable for kaolin dispersion.

|  | Control* | D | Control II* | E | F | Control III* | G | H | Control IV* | I | J |
|---|---|---|---|---|---|---|---|---|---|---|---|
| Dispersant Blend Composition | | | | | | | | | | | |
| % Soda Ash | 45.5 | 8.5 | 45.5 | 24.3 | 37.6 | 45.5 | 40.0 | 28.8 | 45.5 | 11.4 | 13.0 |
| % Sodium Polyacrylate/ Polyacrylic Acid | 24.5 | 40.0 | 24.5 | 29.0 | 32.0 | 24.5 | 30.9 | 33.9 | 24.5 | 26.5 | 25.5 |
| % Sodium Silicate | N/A | 31.5 | N/A | 30.8 | 22.8 | N/A | 20.1 | 23.6 | N/A | 42.1 | 42.1 |
| % NaOH | N/A | 20.0 | N/A | 15.9 | 7.6 | N/A | 9.0 | 13.8 | N/A | 20.0 | 19.4 |
| % SHMP | 30 | N/A | 30 | N/A | N/A | 30 | N/A | N/A | 30 | N/A | N/A |
| Optimum Dispersant Dosage (#/ton) | 8.5 | 9.0 | 8.5 | 9.25 | 9.0 | 8.25 | 9.0 | 8.75 | 8.25 | 8.5 | 8.5 |
| Slurry pH | 6.8 | 6.2 | 6.8 | 7.7 | 7.2 | 6.7 | 7.9 | 7.4 | 6.9 | 7.4 | 7.3 |
| Brookfield Viscosity (cP) | | | | | | | | | | | |
| Initial | 272 | 300 | 288 | 373 | 349 | 265 | 328 | 342 | 292 | 325 | 322 |
| 24 hr | 386 | 430 | 300 | 445 | 460 | 308 | 431 | 432 | 310 | 411 | 376 |
| 48 hr | 365 | 423 | 275 | 396 | 420 | 305 | 462 | 448 | 330 | 466 | 420 |
| 7 day | 732 | 470 | 345 | 499 | 750 | 654 | 772 | 652 | 455 | 750 | 610 |

*Composition of the dispersant blend described in the control is proprietary to BASF.

were tested using undispersed Miragloss OP filter cake, a fine particle size BASF kaolin product. The specific resistance was measured for each filter cake sample to ensure a similar concentration of charged ions for each dispersant blend tested. The dispersant blend was added to the filter cake during blunging until it was effectively dispersed. The slurry was then spray dried and redispersed at high solids (70% by weight). Additional dispersant blend was added until the slurry reached a minimum Brookfield (low shear) viscosity value at 20 rpm indicating optimum dispersion. The dispersant addition is optimized in order to obtain the minimum initial viscosity and the maximum slurry stability over time. The kaolin slurry was then aged at elevated temperature for 24, 48, and 168 hours.

Example 3

Example 3 shows data obtained for 3 dispersant combinations (K, L, and M) where a low pH sodium polyacrylate was added individually relative to the other chemical components. Dispersant combination K and L utilized a low pH sodium polyacrylate produced by manufacturer B. Dispersant combination M utilized a low pH sodium polyacrylate produced by manufacturer A. The control samples correspond to the experimental samples located in the column/columns to the left of the specific control. These results demonstrate separate addition of the low pH sodium polyacrylate enables the formation of stable kaolin slurries at neutral pH with prolonged stability.

|  | Control* | K | L | Control II* | M |
|---|---|---|---|---|---|
| Dispersant Blend Composition | | | | | |
| % Soda Ash | 45.5 | 46 | 48 | 45.5 | 49 |
| % Sodium Polyacrylate/ Polyacrylic Acid | 24.5 | 29 | 30 | 24.5 | 29 |
| % Sodium Silicate | N/A | 25 | 22 | N/A | 22 |
| % SHMP | 30 | N/A | N/A | 30 | N/A |
| Optimum Dispersant Dosage (#/ton) | 9.25 | 10.25 | 10.75 | 8.5 | 10.0 |
| Slurry pH | 7.3 | 7.8 | 8.0 | 6.8 | 7.1 |
| Brookfield Viscosity (cP) | | | | | |
| Initial | 273 | 327 | 360 | 257 | 363 |
| 24 hr | 303 | 453 | 483 | 374 | 384 |
| 48 hr | 318 | 457 | 470 | 357 | 423 |
| 7 day | 425 | 495 | 660 | 810 | 438 |

Example 4

Example 4 contains blends of interest that were unsuitable for use as a dispersant package due to gelling or precipitation that occurred while blending the individual components.

|  | A | B | C | D | E | F | G | H |
|---|---|---|---|---|---|---|---|---|
| % Soda Ash | 45 | 70 | 53 | 61 | 45 | 60 | 48 | 49 |
| % Sodium Polyacrylate/ Polyacrylic Acid | 30 | 15 | 15 | 15 | 30 | 19 | 20 | 22 |
| % Sodium Silicate | 25 | 15 | 32 | 24 | 25 | 21 | 32 | 29 |

Various embodiments of this invention are described herein, including the best mode known to the inventors for carrying out the invention. It should be understood that the illustrated embodiments are exemplary only, and should not be taken as limiting the scope of the invention.

What is claimed is:

1. A method of stabilizing a hydrous kaolin slurry containing greater than 65% hydrous kaolin by weight comprising adding a dispersant blend comprising sodium carbonate in an amount of from 5% to 50% by weight, sodium polyacrylate and/or polyacrylic acid in an amount of from 15% to 45% by weight, sodium silicate in an amount of from 15% to 55% by weight, and sodium hydroxide in an amount of from greater than 0% to 25% by weight, based on the weight of the dispersant blend to said hydrous kaolin slurry, said hydrous kaolin slurry being devoid of a phosphate-containing dispersant.

2. The method of claim 1, wherein the average molecular weight of the sodium polyacrylate or the polyacrylic acid as measured by size exclusion chromatography ranges from 1900 to 6000.

3. The method of claim 2, wherein the average molecular weight of the sodium polyacrylate or the polyacrylic acid as measured by size exclusion chromatography ranges from 2600 to 4400.

4. The method of claim 1, wherein the modulus or weight ratio of $SiO_2$ to $Na_2O$ of the sodium silicate ranges from 1.6 to 3.3.

5. The method of claim 4, wherein the modulus of sodium silicate ranges from 1.8 to 2.6.

6. The method of claim 1, comprising (a) adding the sodium polyacrylate and/or the polyacrylic acid to the hydrous kaolin slurry at a pH of less than 7 and separately (b) adding the sodium carbonate and the sodium silicate to the hydrous kaolin slurry.

7. The method of claim 6, wherein the average molecular weight of the sodium polyacrylate or the polyacrylic acid as measured by size exclusion chromatography ranges from 1900 to 6000.

8. The method of claim 7, wherein the average molecular weight of the sodium polyacrylate or the polyacrylic acid as measured by size exclusion chromatography ranges from 2600 to 4400.

9. The method of claim 6, wherein the modulus or weight ratio of $SiO_2$ to $Na_2O$ of the sodium silicate ranges from 1.6 to 3.3.

10. The method of claim 9, wherein the modulus of sodium silicate ranges from 1.8 to 2.6.

* * * * *